United States Patent
Damania

(10) Patent No.: US 12,486,153 B2
(45) Date of Patent: Dec. 2, 2025

(54) SAFETY CONTROL UNIT FOR A LIFTING ARM MACHINE

(71) Applicant: Caterpillar Inc., Peoria, IL (US)

(72) Inventor: Mayur Damania, Leicester (GB)

(73) Assignee: Caterpillar Inc., Peoria, IL (US)

( * ) Notice: Subject to any disclaimer, the term of this patent is extended or adjusted under 35 U.S.C. 154(b) by 277 days.

(21) Appl. No.: 18/144,301

(22) Filed: May 8, 2023

(65) Prior Publication Data

US 2023/0365388 A1   Nov. 16, 2023

(30) Foreign Application Priority Data

May 11, 2022   (GB) .................................... 2206878

(51) Int. Cl.
  *B66F 17/00*   (2006.01)
  *B66F 9/065*   (2006.01)
  *B66F 9/20*    (2006.01)

(52) U.S. Cl.
  CPC .......... *B66F 17/006* (2013.01); *B66F 9/0655* (2013.01); *B66F 9/20* (2013.01)

(58) Field of Classification Search
  CPC ......... B66F 17/006; B66F 9/0655; B66F 9/20
  (Continued)

(56) References Cited

U.S. PATENT DOCUMENTS

| | | | |
|---|---|---|---|
| 4,042,135 A | 8/1977 | Pugh et al. | |
| 5,160,055 A * | 11/1992 | Gray | B66C 23/90 |
| | | | 212/278 |

(Continued)

OTHER PUBLICATIONS

Great Britain Search Report related to Application No. 2206878.7; reported on Nov. 8, 2022.

*Primary Examiner* — Kerri L Mcnally

(57) ABSTRACT

A safety control unit for controlling a lifting arm of a lifting arm machine is provided. The safety control unit comprises a safety control unit housing, a sensor input, a first processor and a second processor. The sensor input is configured to receive a first signal indicative of a toppling moment of the lifting arm about the lifting arm machine and a second signal indicative of the toppling moment of the lifting arm about the lifting arm machine, wherein the first and second signals are independent of each other. The first processor is provided within the safety control unit housing and configured: to receive the first signal, to determine a first toppling moment based on the first signal, and to output the first toppling moment. The second processor is independent of the first processor and provided within the safety control unit housing. The second processor is configured: to receive the second signal, to determine a second toppling moment based on the second signal, to receive the first toppling moment from the first processor, and to cross-check that first toppling moment and the second toppling moment are within a predetermined range of each other. Further, the safety control unit is configured: to determine whether the first toppling moment and the second toppling moment exceed a predetermined threshold, and to output a toppling safety command signal if the safety control unit determines the predetermined threshold or the predetermined range is exceeded. A display unit and a lifting arm safety system, each comprising the safety control unit is also provided.

20 Claims, 5 Drawing Sheets

(58) Field of Classification Search
USPC .......................................................... 340/440
See application file for complete search history.

(56) References Cited

U.S. PATENT DOCUMENTS

| | | | | |
|---|---|---|---|---|
| 8,965,637 | B2* | 2/2015 | Brooks | B66F 9/0655 |
| | | | | 414/718 |
| 9,206,026 | B2 | 12/2015 | Aulton et al. | |
| 9,776,846 | B2* | 10/2017 | Ditty | B66F 9/07559 |
| 9,821,781 | B1* | 11/2017 | Karpenko | B60T 7/042 |
| 11,185,003 | B2* | 11/2021 | Mei | B60T 8/18 |
| 2004/0085184 | A1* | 5/2004 | Sigmund | B66F 11/046 |
| | | | | 340/3.42 |
| 2017/0325444 | A1* | 11/2017 | Crinklaw | A01M 7/0089 |
| 2021/0002111 | A1* | 1/2021 | Rushton | B66F 9/07554 |

* cited by examiner

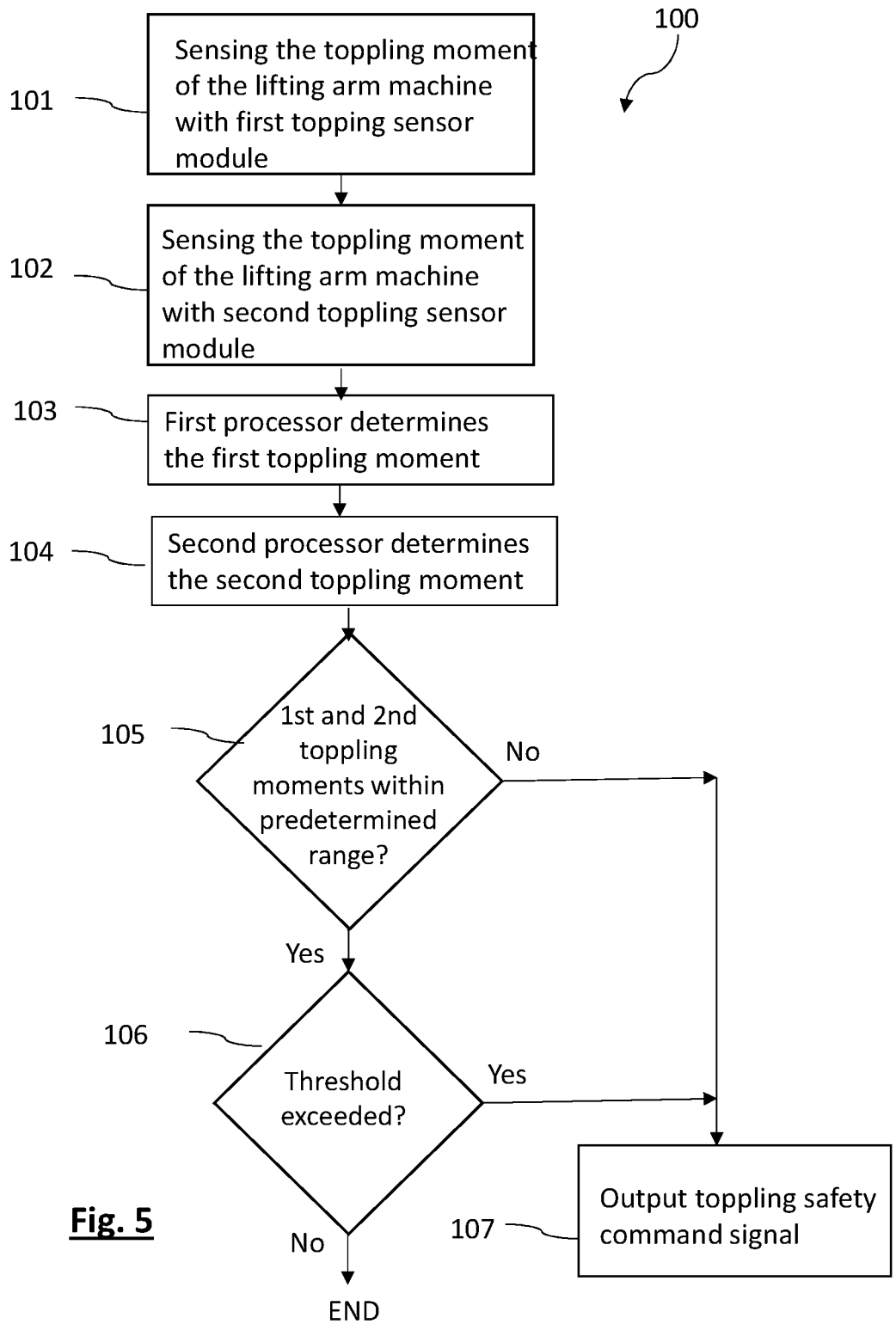

SAFETY CONTROL UNIT FOR A LIFTING ARM MACHINE

CROSS-REFERENCE TO RELATED APPLICATION

This application claims priority under 35 USC § 119 and the Paris Convention to Great Britain Patent Application 2206878.7 filed on May 11, 2022.

FIELD OF THE DISCLOSURE

The present disclosure relates to machines having one or more lifting arms. In particular, the present disclosure relates to the sensing of a toppling moment associated with the lifting arm.

BACKGROUND

Machines such as Telehandlers typically comprise a lifting arm. These lifting arms are used to lift, carry and place materials around construction sites, agricultural sites and the like. For a machines such as a Telehandler, the payload can be lifted and carried by the lifting arm at a point outside the wheel base of the Telehandler.

When operating the machine, an operator must ensure that the payload is within the rated load capacity of the machine to minimise the risk of the machine toppling over in the longitudinal direction.

US-A-20130238202 discloses a longitudinal stability monitoring system which controls a boom lift down speed for a lift vehicle. The lift vehicle includes a vehicle chassis supported on front and rear wheels respectively coupled with a front axle and a rear axle, and a boom pivotally coupled to the lift vehicle. The system monitors a vertical load on the rear axle and manages boom lift down speed based on the vertical load. Additionally, the system may manage the boom lift down speed based on both the vertical load on the rear axle and an anticipated operator demand according to a signal from an operator input device.

SUMMARY

According to a first aspect of the disclosure a safety control unit for controlling a lifting arm of a lifting arm machine is provided. The safety control unit comprises a safety control unit housing, a sensor input, a first processor and a second processor. The sensor input is configured to receive a first signal indicative of a toppling moment of the lifting arm about the lifting arm machine and a second signal indicative of the toppling moment of the lifting arm about the lifting arm machine, wherein the first and second signals are independent of each other. The first processor is provided within the safety control unit housing and configured: to receive the first signal, to determine a first toppling moment based on the first signal, and to output the first toppling moment. The second processor is independent of the first processor and provided within the safety control unit housing. The second processor is configured: to receive the second signal, to determine a second toppling moment based on the second signal, to receive the first toppling moment from the first processor, and to cross-check that first toppling moment and the second toppling moment are within a predetermined range of each other. Further, the safety control unit is configured: to determine whether the first toppling moment and the second toppling moment exceed a predetermined threshold, and to output a toppling safety command signal if the safety control unit determines the predetermined threshold or the predetermined range is exceeded.

The safety control unit of the first aspect is configured to monitor two independent signals (the first and second signals) indicative of the toppling moment of the lifting arm machine. For such a safety-critical monitoring task, the safety control unit comprises two independent processors which independently monitor the toppling moment. Each processor independently determines a toppling moment of the lifting arm machine based on the respective first and second signals. Where the safety control unit determines that a toppling moment exceeds a predetermined threshold, the safety control unit outputs a toppling safety command signal for the machine and/or operator to take further action. The safety control unit also performs a cross-check function to monitor the relative values of the first and second toppling moments which are determined by the independent processors. Should the first and second toppling moments deviate from each other beyond a predetermined range, for example due to a sensor failure or excessive sensor drift, the safety control unit also outputs the toppling safety command signal for the machine and/or operator to take further action.

The safety control unit incorporates the two independent first and second processors within a single safety control unit housing. As such, the safety control unit can provide lifting arm toppling monitoring functionality with built-in redundancy in a single unit. Such a single-unit device can be easily incorporated into the design of a machine or retrofitted onto existing machines in a straightforward manner. For such a safety critical monitoring task, it is undesirable to distribute the monitoring functionality across various different processors that may be provided on the machine (e.g. across one or more Engine Control Units) as such processors may be difficult to update or replace. By integrating the processors into a single safety control unit, the risk of a maintenance task (e.g. replacing or updating an Engine Control Unit) interfering with the monitoring functionality of the safety control unit is reduced or eliminated.

Furthermore, it will be appreciated that by providing the two processors in a single unit, communication between the two processors for the purpose of performing a cross-check can be implemented in a straightforward and robust manner. Where processors are distributed across a machine, implementing a cross-check functionality is also more challenging to implement as a suitable communication protocol must be implemented for the safety-critical information. Furthermore, processors distributed across a machine may operate on different operating systems, making it more complicated to perform the cross-check function.

It will be appreciated that the present disclosure relates to lifting arm machines. A lifting arm machine according to this disclosure is understood to be any machine which incorporates a lifting arm for the purpose of lifting a payload. In particular, the present disclosure is applicable to lifting arm machines wherein use of the lifting arm to lift a payload results in a toppling moment acting on the lifting arm about the lifting arm machine. Such a toppling moment, if of sufficient magnitude, may cause the lifting arm machine to topple over about the pivot point.

In particular, lifting arm machines according to this disclosure may be a lifting arm vehicle. As such, a lifting arm vehicle comprises a lifting arm, and a chassis, wherein the lifting arm is attached to the chassis. The chassis may comprise wheels, tracks, or other motive means for moving the lifting arm vehicle. Examples of lifting arm vehicles include a variable reach vehicle, a telehandler, or a mobile elevating work platform.

In some embodiments, the second processor may be configured to operate as a "master processor", while the first processor may be configured to operate as a "slave processor". Accordingly, the second processor (master processor) may be configured to determine whether the first toppling moment and the second toppling moment exceed a predetermined threshold and output a toppling safety command signal accordingly. The second processor also performs the cross check as described above. In some embodiments, the first processor may be configured to check whether the first toppling moment exceeds the predetermined threshold and output a toppling safety command signal accordingly. That is to say, in some embodiments, only the second processor (master processor) may be configured to output a toppling safety command signal, or in some embodiments both the first and second processors may be configured to output a toppling safety command signal. Having both processors be capable of outputting the toppling safety command signal may provide additional redundancy for the safety control unit.

In some embodiments, the safety control unit comprises an output port configured to output the toppling safety command signal to an Engine Control Unit of the lifting arm machine to operate the lifting arm in a toppling prevention mode. As such the safety control unit can cause the machine to operate in a toppling prevention mode should either of the predetermined threshold or the predetermined range be exceeded. In a toppling prevention mode, the lifting arm machine may be prevented from performing certain actions which may increase the likelihood of the lifting arm machine toppling. For example, the lifting arm machine may be prevented from further extending the lifting arm, or performing any other actions which increase the likelihood of toppling. In a toppling prevention mode, an operator may still be allowed to retract or lower the lifting arm, or perform other actions which decrease the likelihood of toppling.

In some embodiments, the safety control unit is configured to output a visible toppling warning signal and/or an audible toppling warning signal for an operator of the lifting arm machine based on the toppling safety command signal. As such, the safety control unit may comprise one or more warning lights and/or warning speakers/buzzers which are configured to providing suitable warning signals for the operator. By integrating the warning functionality into the safety control unit, the safety control unit provides a robust system for issuing a warning signal to an operator.

In some embodiments, the safety control unit is configured to monitor the toppling moment of the lifting arm vehicle. The safety control unit may monitor the toppling moment based on the first and second signals. For example, the safety control unit may monitor the toppling moment at least once every: 1000 ms, 100 ms, or 10 ms. That is to say, the first and second processors of the safety control unit may determine the first and second toppling moments at least once every 1000 ms, 100 ms, or 10 ms. As such, the safety control unit may be configured to repeatedly determine whether the first and second toppling moments are within the predetermined range and the predetermined threshold in order to provide ongoing monitoring of the lifting arm machine.

According to a second aspect of the disclosure, a display unit for a lifting arm machine is provided. The display unit comprises a display and a safety control unit according to the first aspect of the disclosure.

The second aspect of the disclosure, which incorporates the first aspect of the disclosure may thus include and of the optional features of the first aspect discussed above. By providing the safety control unit as part of a display unit, the safety control unit may provide information regarding the toppling status of the lifting arm machine to the operator of the machine via the display of the display unit. Such a display unit may be used by the operator of the lifting arm machine, at least in part, during operation of the lifting arm machine to control or monitor the operation of the lifting arm machine. Thus, integration of the safety control unit into the display unit provides a convenient location for the safety control unit which is proximal to the machine operator.

In some embodiments, the display is configured to output a value or signal indicative of the toppling moment of the lifting arm about the lifting arm machine based on the first and second signals. For example, the display may output a value indicative of the first or second toppling moment. In some embodiments, the display may output the greatest value of the first and second toppling moments. As such, the display may provide the operator with real-time information regarding the loading of the lifting arm machine. For example, the display may output a scale indicating the toppling moment of the lifting arm machine relative to the first threshold value in order to provide the operator with feedback regarding the loading of the lifting arm machine.

According to a third aspect of the disclosure a lifting arm safety system for a lifting arm machine is provided. The lifting arm safety system comprises the safety control unit the first aspect or the display unit of the second aspect, and a toppling sensor unit. The toppling sensor unit is configured to be mounted to the lifting arm machine. The toppling sensor unit comprises: a first toppling sensor module configured to output a first signal indicative of a toppling moment of the lifting arm about the lifting arm machine, and a second toppling sensor module configured to output a second signal indicative of the toppling moment of the lifting arm about the lifting arm machine.

As such, the lifting arm safety system of the third aspects includes the safety control unit of the first aspect or the second aspect and a toppling sensor unit. The toppling sensor unit is configured to be attached to the lifting arm machine to sense the toppling moment and generate the first and second signals for the safety control unit. By integrating the first and second toppling sensor modules into a single toppling sensor unit, the lifting arm safety system can be provided with two units. Such an implementation is a space efficient and robust implementation of a system for detecting the toppling of a lifting arm machine.

The third aspect of the disclosure may incorporate any of the optional features of the first and second aspects described above.

In some embodiments, the first toppling sensor module and the second toppling sensor module each comprise a strain gauge configured to be attached to a weight-bearing member of the machine. For example, where the lifting arm machine includes an axel, or similar member which is deformed under the weight of the lifting arm machine, the deformation of the axel or similar member may be indicative of the toppling moment of the machine.

In some embodiments, the toppling sensor unit is configured to output the first and second signals to the sensor input of the safety control unit over a Control Area Network (CAN) bus. In some embodiments, the toppling sensor unit further comprises a wireless communications module configured to output the first and second signals to the sensor input of the safety control unit using a wireless communication method. As such, the toppling sensor unit can communicate the first and second signals to the safety control unit using a wired or wireless communication method.

In some embodiments, the first toppling sensor module is electrically isolated from the second toppling sensor module. Accordingly, the toppling sensor modules of the toppling sensor unit may also have built in redundancy.

According to a fourth aspect of the disclosure a lifting arm machine is provided. The lifting arm machine comprises a lifting arm safety system according to the third aspect, wherein the toppling sensor unit is mounted to the lifting arm machine.

The fourth aspect of the disclosure may incorporate any of the optional features of the first, second, and third aspects described above.

In some embodiments, the lifting arm machine comprises an Engine Control Unit configured to control the lifting arm, wherein the safety control unit is configured to output toppling safety command to the Engine Control Unit.

In some embodiments, the lifting arm machine is a lifting arm vehicle, a variable reach vehicle, a telehandler, or a mobile elevating work platform, or an aerial work platform.

According to a fifth aspect of the disclosure, a method of monitoring the toppling moment of a lifting arm machine is provided. The method comprises:
  sensing the toppling moment of the lifting arm about the lifting arm machine with a first toppling sensor module and outputting a first signal indicative of the toppling moment to a safety control unit;
  sensing the toppling moment of the lifting arm about the lifting arm machine with a second toppling sensor module and outputting a second signal indicative of the toppling moment to the safety control unit;
  wherein the safety control unit:
    uses a first processor housed within the safety control unit to:
      determine a first toppling moment based on the first signal; and
      output the first toppling moment;
    uses a second processor housed within the safety control unit and independent of the first processor to:
      determine a second toppling moments based on the second signal;
      receive the first toppling moment from the first processor; and
      cross-check that first toppling moment and the second toppling moment are within a predetermined range of each other;
  wherein the safety control unit further:
    determines whether the first toppling moment and the second toppling moment exceed a predetermined threshold; and
    outputs a toppling safety command signal if the safety control unit determines that the predetermined threshold or the predetermined range is exceeded.

The fifth aspect of the disclosure may incorporate any of the optional features of the first, second, third, and fourth aspects described above.

In some embodiments, the safety control unit outputs the toppling safety command signal to an Engine Control Unit of the lifting arm machine to operate the lifting arm in a toppling prevention mode.

In some embodiments, the safety control unit further comprises a display which outputs a value or signal indicative of the toppling moment of the lifting arm about the lifting arm machine based on the first and second toppling moments.

In some embodiments, the safety control unit outputs a visible toppling warning signal and an audible toppling warning signal for an operator of the lifting arm machine based on the toppling safety command signal.

BRIEF DESCRIPTION OF THE FIGURES

A specific embodiment of the disclosure will now be described with reference to the following figures in which:

FIG. 5 is a block diagram of a method of monitoring the toppling moment of a lifting arm machine according to an embodiment of the disclosure.

DETAILED DESCRIPTION

Figure 1:
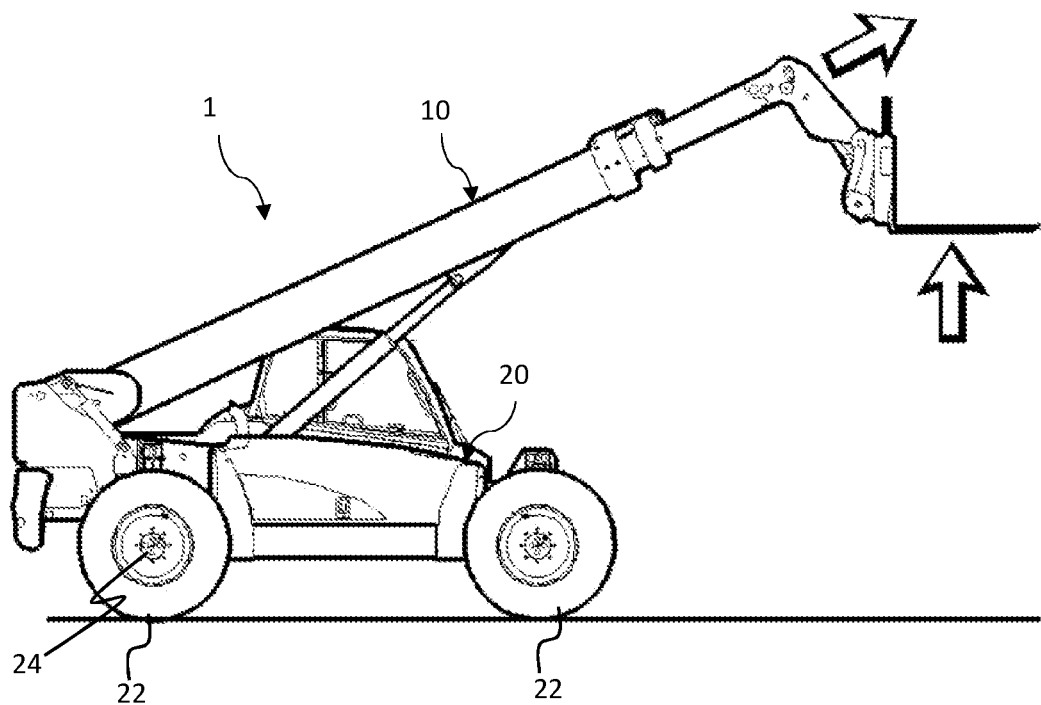
FIG. 1 is a schematic diagram of a lifting arm machine 1 according to an embodiment of this disclosure.

According to an embodiment of the disclosure, a lifting arm machine 1 is provided. FIG. 1 shows a schematic diagram of a lifting arm machine 1 according to an embodiment of the disclosure.

The lifting arm machine 1 of FIG. 1 is a Telehandler. It will be appreciated that the Telehandler is one example of a lifting arm machine 1 according to this disclosure. The lifting arm machine 1 of FIG. 1 comprises a lifting arm 10 and a chassis 20. The lifting arm machine 1 also comprises a set of wheels 22 a front axle (not shown) and a rear axle 24. Each of the front and rear axles 24 connects a pair of wheels 22 to the chassis 20.

The lifting arm 10 shown in FIG. 1 is one example of a lifting arm 10 according to this disclosure. The lifting arm 10 is a telescopic boom arm. Other types of lifting arm 10 are well known to the skilled person and the skilled person.

The lifting arm machine 1 comprises a safety control system 30, which is discussed in more detail below with reference to FIGS. 2 and 3.

Figure 2:
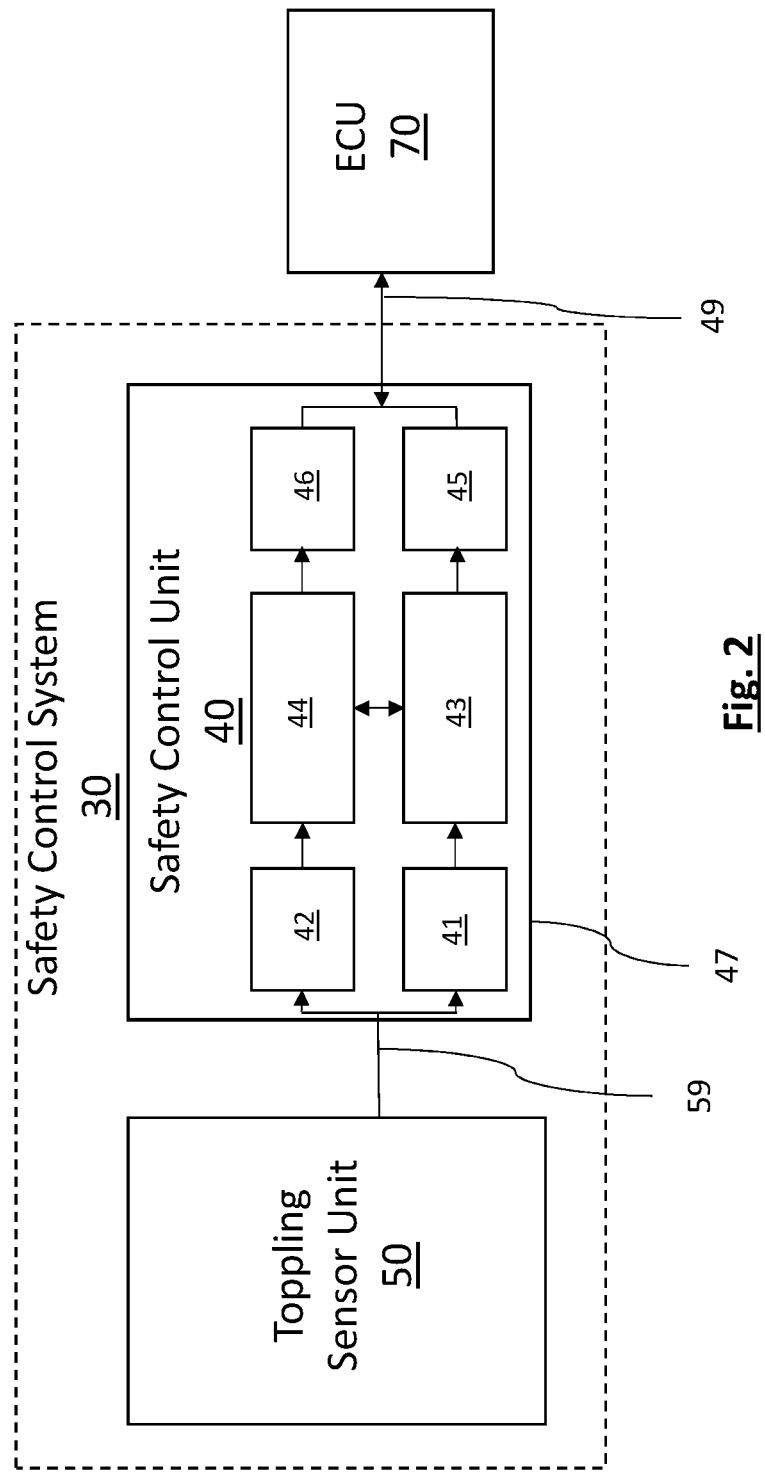
FIG. 2 is a block diagram of a safety control system according to an embodiment of the disclosure.

FIG. 2 is a block diagram of a safety control system 30 according to an embodiment of the disclosure. As shown in FIG. 2, the safety control system 30 comprises a safety control unit 40 and a toppling sensor unit 50.

Figure 3:
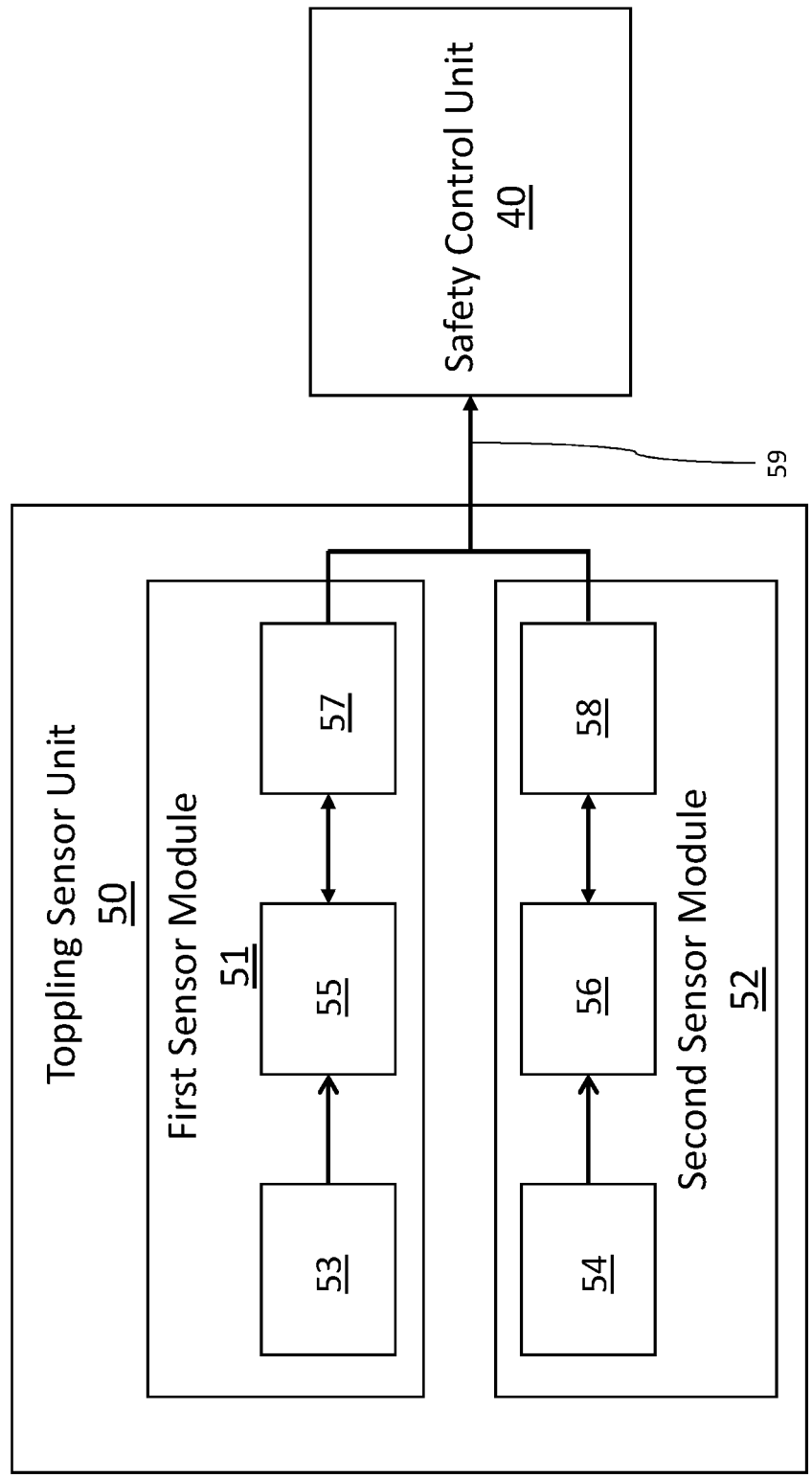
FIG. 3 is a block diagram of a toppling sensor module.

FIG. 3 shows a schematic block diagram of the toppling sensor unit 50. As shown in FIG. 3, the toppling sensor unit 50 comprises a first toppling sensor module 51 and a second toppling sensor module 52. The first toppling sensor module 51 is configured to output a first signal indicative of a toppling moment of the lifting arm 10 about the lifting arm machine 1. Similarly, the second toppling sensor module 52 is configured to output a second signal indicative of the toppling moment of the lifting arm 10 about the lifting arm machine 1.

In the embodiment of FIG. 3, the first toppling sensor module 51 comprises a first strain gauge 53 and the second toppling sensor module 52 comprises a second strain gauge 54. The first and second strain gauges 53, 54 are each mounted on the rear axle 24 and configured to detect a strain in the rear axle 24 of the lifting arm machine 1. In the lifting arm machine 1 of FIG. 1, it is understood that the variable toppling moment of the lifting arm 10 acting about the front wheels (pivot point) of the lifting arm machine 1 may cause the force acting through the rear wheels 22 to vary. For example, in the event that the lifting arm 10 is operated such that the lifting arm machine 1 is on the point of toppling, the rear wheels 22 may start to lift off the ground. As such, it will be appreciated that the strain in the rear axle 24 is indicative of the toppling moment of the lifting arm 10 about the lifting arm machine 1. Specifically, a reduction in the strain the rear axle 24 may be indicative of an increase in the toppling moment.

The first and second strain gauges 53, 54 may be mounted on a sensor bridge (not shown), which is in turn may be mounted on the rear axle 24 of the lifting arm machine 1. Alternatively, each of the first and second strain gauges may be mounted directly to the rear axle 24.

Each of the first and second toppling sensor modules 51, 52 may also comprise a processor, or microcontroller (MCU) (first MCU 55 and second MCU 56) configured to process the output from the respective first and second strain gauge 53, 54 and to generate a respective signal (first signal and second signal) indicative of the toppling moment of the lifting arm 10. Each of the first and second toppling sensor modules 51, 52 may also comprise a Control Area Network (CAN) driver module (first CAN driver 57 and second CAN driver 58). Each CAN driver may be configured to output the respective signal on a Control Area Network bus 59. The CAN bus may be connected to the safety control unit 40. As such, each of the first and second toppling sensor modules 51, 52 may communicate the respective first and second signals to the safety control unit via a CAN bus 59.

Each of the first and second toppling sensor module 51, 52 may be electrically isolated from each other. By electrically isolating the first and second toppling sensor modules 51, 52, the toppling sensor unit 50 may be operated in a robust manner.

As an alternative to, or an addition to, the CAN bus 59 and first and second CAN driver modules 57, 58, each of the first and second toppling sensor module 51, 52 may comprise a wireless communication module configured to communicate wirelessly with the safety control unit 40.

A block diagram of the safety control unit 40 is shown in FIG. 2. The safety control unit 40 comprises a first receiving module 41, a second receiving module 42, a first processor 43, a second processor 44, a first output module 45, a second output module 46, and a safety control unit housing 47.

The first and second receiving modules 41, 42 may be configured to receive the first and second signals from the toppling sensor unit 50. In the embodiment of FIG. 2, the first and second receiving modules 41, 42 may be configured to receive the first and second signals from the CAN bus 59. As such, the CAN bus 59 may be connected to a sensor input (not shown) of the safety control unit 40, which is in turn connected to each of the first and second receiving module 41, 42. Alternatively, the safety control unit 40 may comprise two sensor inputs configured to be connected to the CAN bus 59, one for each of the first and second receiving modules 41, 42. Each of the first and second receiving modules 41, 42 may be configured to detect and transfer the first and second signals to the first and second processors 43, 44 respectively.

In some embodiments, the first and second receiving modules 41, 42 may also be configured to communicate with the toppling sensor unit 50. As such, the first and second receiving modules 41, 42 may be first and second transceiver modules respectively. Said transceiver modules may use two-way communication to confirm receipt of the first and second signals for example. Such message confirmation may improve the robustness of the safety control system 30. Two way communication may be particularly advantageous when the first and second signals are transmitted wirelessly.

The first and second processors 43, 44 provide independent processing channels for the first and second signals. As such, the safety control unit 40 has two processing channels for determining whether the toppling moment detected by the toppling sensor unit 50 exceeds a safe level. The first and second processors 43, 44 may be operated in a master-slave arrangement. For example, in the embodiment of FIG. 2, the first processor 43 may be a slave processor and the second processor 44 may be the master processor. Of course, in other embodiments, the first processor 43 may be the master processor and the second processor 44 may be the slave processor.

The first processor 43 receives the first signal from the first receiver module 41. The first communication module is configured to determine signal first toppling moment based on the first signal. For example, where the first signal comprises data from a strain gauge, the first processor 43 may be configured to convert the strain gauge data into a first toppling moment based on a known relationship available to the first processor 43. For example, the first processor 43 may perform a calculation or reference a look-up table to determine the first toppling moment. The conversion of strain gauge data to a moment may be calibrated depending on the type of lifting arm machine 1 to which the safety control unit 40 is attached.

The second processor 44 may be configured to receive the second signal from the toppling sensor unit 50. In some embodiments, the second processor 44 may also receive the first signal. As shown in FIG. 2, the second processor 44 receives the signals from the second receiver module 42. The second processor 44 is configured to determine a second toppling moment based on the second signal. The second processor 44 may determine the second toppling moment in substantially the same manner as the first processor 43 determines the first toppling moment.

As shown in FIG. 2, the second processor 44 is also configured to communicate with the first processor 43, and vice versa. The first processor 43 is configured to output the first toppling moment to the second processor 44. The second processor 44 may also communicate with the first processor 43 in order to request and/or confirm receipt of the first toppling moment from the first processor 43.

The second processor 44 is configured to cross-check that first signal and the second toppling moments are within a predetermined range of each other. Checking that the first and second toppling moments are within a predetermined range of each other provides an indication that both sensors are operating normally. It will be appreciated that over time, the first and second signals generated by the respective first and second sensor modules 51, 52 may drift somewhat. For example, the output of strain gauges may be prone to measurement drift over time, such that the associated first and second toppling moments may also drift. Accordingly, the predetermined range may be set to allow for some measurement drift of the first and second signals. As an example, the second processor 44 may be configured to determine if the first toppling moment is within a value of ±20% of the second toppling moment. That is to say, the predetermined range may be ±20% of the second toppling moment. When the first toppling moment differs from the second signal by greater than ±20%, such a difference may be indicative of excessive sensor drift, or even a sensor malfunction. Accordingly, when the second processor 44 determines that the predetermined range is exceeded, the second processor 44 is configured to output the toppling safety command signal.

The safety control unit is also configured to determine whether the first toppling moment and the second toppling moment exceed a predetermined threshold. The predetermined threshold may be a predetermined value which can be specified during calibration of the safety control unit 40 based on the lifting arm machine 1. As such, the predetermined threshold represents the maximum toppling moment that may be safely applied to the lifting arm 10. Application of a moment in excess of the predetermined threshold may pose a risk of the lifting arm machine 1 toppling. It will be appreciated that the numerical value of the predetermined threshold will depend on the nature of the lifting arm machine 1 for which the safety control system 30 is calibrated. The predetermined threshold will also depend on the safety margin to be applied relative to the actual toppling moment which would cause the lifting arm machine 1 to topple.

In the embodiment of FIG. 2, the second processor 44 performs the determination after performing the cross-check. The second processor 44 may check the greater of the first and second toppling moments against the predetermined threshold. In the event that the second processor 44 determines that the predetermined threshold is exceeded, the second processor 44 is configured to output a toppling safety command signal. The toppling safety command signal may cause the safety control system/lifting arm machine 1 to operate in a toppling prevention mode.

In the embodiment of FIG. 2, the second processor 44 acts as the master processor, in that it performs both a determination of whether the predetermined threshold is exceeded and also a determination of whether the predetermined range is exceeded (based on the first and second signals). In the event that the second processor 44 determines that the predetermined threshold is exceeded, or that the predetermined range is exceeded, the second processor 44 is configured to output the toppling safety command signal. In other embodiments, each of the first and second processors 43, 44 may be configured to determine whether the predetermined threshold is exceeded based on the respective first and second toppling moments, wherein each of the first and second processors 43, 44 may be configured to output a toppling safety command signal in the event that the predetermined threshold is exceeded.

The first and second processors 43, 44 may each comprise individual microprocessors, or individual central processing units (CPUs) and the like. Essentially, the first and second processors 43, 44 may be provided by any suitable computational hardware which provides suitable independence between the first and second processors 43, 44 to allow for redundant, independent comparison of the toppling moment based on the first and second signals and to the predetermined threshold and a cross check of the first and second signals.

As shown in FIG. 2, the safety control unit 40 is configured to transmit the toppling safety command to an Engine Control Unit (ECU) 70. In order to transmit the toppling safety command, the safety control unit 40 may comprise a first output module 45 and a second output module 46. The first and second output modules 45, 46 may be connected to the first and second processors 43, 44 respectively. The first and second output modules 45, 46 may be configured to transmit the toppling safety command over a second CAN bus network 49 to the ECU. In embodiments where only the second processor 44 is configured to output the toppling safety command signal, the first output module 45 may provide additional redundancy to allow the first processor 43 to act as a master processor. As such, in the embodiment of FIG. 2 a first CAN bus network 59 is provided for communication between the safety control unit 40 and the toppling sensor unit 50 and a second CAN bus network 49 is provided for communication between the safety control unit 40 and the ECU. In some embodiments, the safety control unit 40 may be configured to communicate with the ECU 70 and the toppling sensor unit 50 via the same CAN bus network (e.g. the first CAN bus network 59). As such, in some embodiments, the functionality of the first and second output modules 45, 46 and the functionality of the first and second receiver modules 41, 42 may be provided by respective first and second transceiver modules (not shown). Where a single CAN bus is used, the safety level integrity of the messages should be maintained.

As shown in FIG. 2, the lifting arm machine 1 may comprise an ECU 70. The ECU 70 may configured to control the lifting arm 10 of the lifting arm machine. On receipt of the toppling safety command, the ECU 70 may change the operation mode of the lifting arm 10. For example, the ECU may prevent the lifting arm 10 from being further extended, or any other action likely to increase the toppling moment of the lifting arm 10 about the lifting arm machine 1. As such, an operator of the lifting arm machine 1 may only be able to retract or raise the lifting arm 10 in order to reduce the likelihood of the machine toppling.

The ECU 70 may keep the lifting arm machine 1 operating in the toppling prevention mode until it no longer receives the toppling safety command signal from the safety control unit 40. Alternatively, in some embodiments, the ECU may be configured to stay in a toppling prevention mode until the lifting arm 10 is returned to a lowered/retracted position within safe operating limits.

The various electronic components of the safety control unit 40 (i.e. the first receiving module 41, second receiving module 42, first processor 43, second processor 44, first output module 45, second output module 46) may be provided within the safety control unit housing 46. The safety control unit housing 47 may include one or more sensor inputs to which the first CAN bus 59 may be connected. Alternatively, where the safety control unit 40 communicates wirelessly, the sensor inputs are effectively contained within the first and second receiving modules 41, 42. The safety control unit housing 47 may also include other inputs to allow the safety control unit 40 to function, for example a power supply unit input, a second CAN bus port, and the like.

In some embodiments, the safety control unit 40 is configured to output a visible toppling warning signal and/or an audible toppling warning signal for an operator of the lifting arm machine 1 based on the toppling safety command signal. As such, the safety control unit housing 47 may also comprise a speaker or buzzer configured to output the audible warning. The safety control unit housing may also comprise one or more light (e.g. LEDs) or a range of LEDs configured to provide a visible indication of the toppling moment.

In some embodiments, the safety control unit 40 may be provided as part of a display unit 60 for a lifting arm machine. As such, the safety control unit housing 47 may be as the display unit housing. A block diagram of a display unit is shown in FIG. 4.

Figure 4:
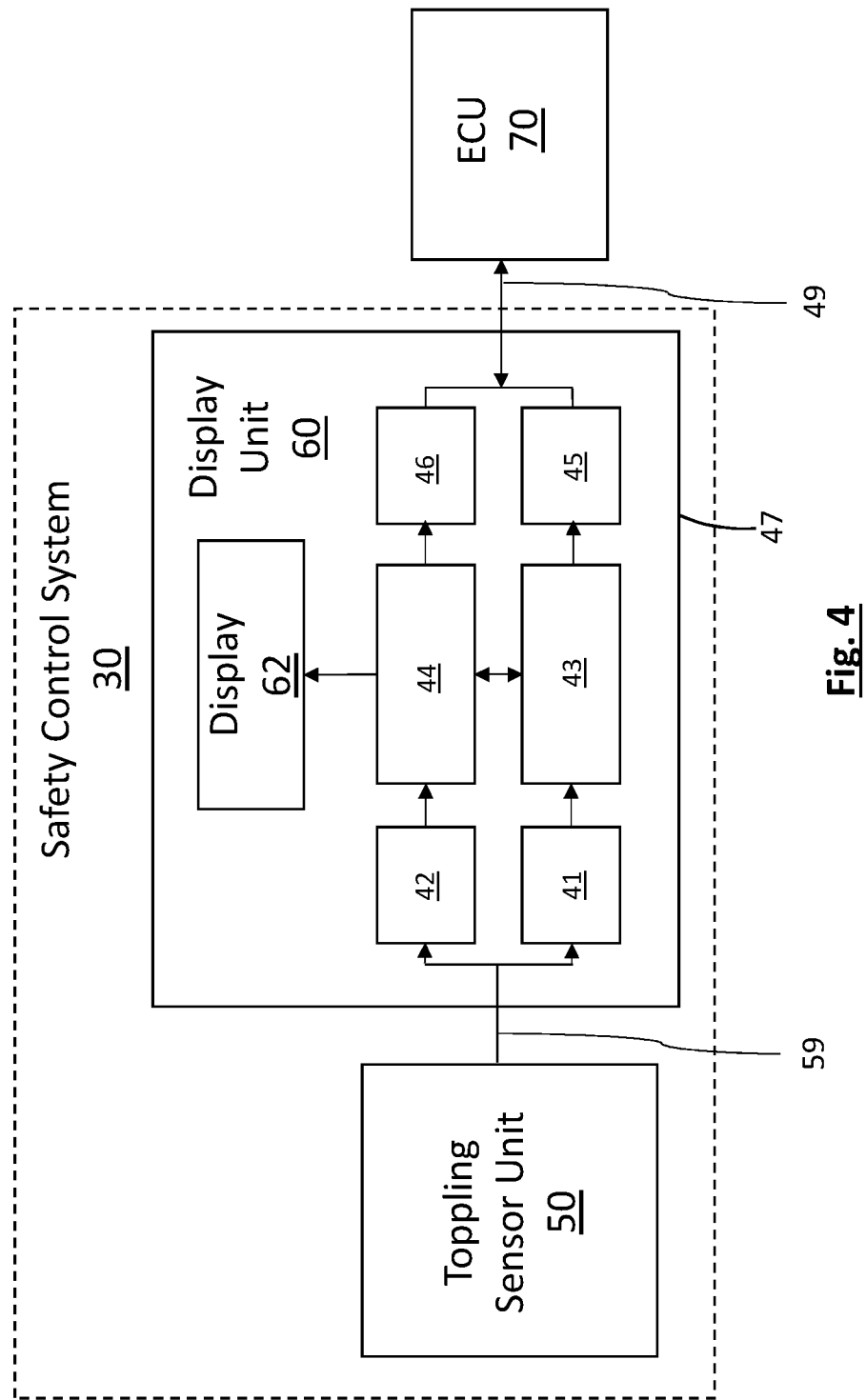
FIG. 4 is a block diagram of a display unit according to an embodiment of the disclosure.

As shown in FIG. 4, the display unit 60 comprises the all the electrical processing capabilities of the safety control unit 40 of FIG. 2. The display unit may also comprise a display 62. The display unit 60 may be configured to provide a display in the operator cabin of a lifting arm machine, or a side-mounted display on a lifting arm machine. As such, the display unit 60 may be configured to provide various control or user interface functions associated with the lifting arm machine, in addition to the toppling moment monitoring functionality of the safety control unit 40.

In some embodiments, the display 62 may be configured to output a value or signal indicative of the toppling moment of the lifting arm about the lifting arm machine based on the first and second toppling moments. For example, the display 62 may output a value or signal based on the greater value of the first and second toppling moments. The display may receive a value or signal for output from the second processor 44 (i.e. the master processor). As such, the display 62 may provide a real-time indication of the toppling moment to the operator of the lifting arm machine 1. By providing a real-time indication of the toppling moment, the operator may, for example, be warned that the toppling moment is approaching the predetermined threshold and may be able to take preventative action to prevent the predetermined threshold being exceeded. The display unit 60 may also comprise an audio output (not shown) such as a buzzer or speaker in order to provide an audible warning signal.

It will be appreciated that the display unit 60 may be provided in place of the safety control unit 40 in the safety control system 30 to be mounted to the lifting arm machine 1.

Next, a method 100 of monitoring the toppling moment of a lifting arm machine 1 will be described with reference to FIG. 5. The method 100 may be performed by the safety control system 30 shown in FIG. 2.

As shown in FIG. 5, the method 100 comprises a first step 101 of sensing the toppling moment of the lifting arm about the lifting arm machine with a first toppling sensor module 51 and outputting a first signal indicative of the toppling moment to a safety control unit 40.

In step 102, the method 100 comprises sensing the toppling moment of the lifting arm about the lifting arm machine with a second toppling sensor module 52 and outputting a second signal indicative of the toppling moment to the safety control unit 40.

It will be appreciated that steps 101 and steps 102 may be performed concurrently by the independent first and second toppling sensor modules 51, 52.

In step 103, the safety control unit 40 uses a first processor 43 housed within the safety control unit 40 to determine the first toppling moment of the lifting arm 10 about the lifting arm machine 1 based on the first signal. As part of step 103, the first processor 43 also transmits the calculated toppling moment to the second processor 44 for the cross-check performed in step 106.

In step 104, the safety control unit 40 uses a second processor 44 housed within the safety control unit 40 and independent of the first processor 43 to calculate the second toppling moment of the lifting arm 10 about the lifting arm machine 1 based on the second signal.

In step 105, the safety control unit uses the second processor 44 to perform a cross check that first toppling moment and the second toppling moment are within a predetermined range of each other. That is to say, the second processor 44 cross checks that the values of the toppling moments calculated in steps 103 and 104 are within the predetermined range of each other. If the second processor 44 determines that the predetermined range is exceeded, the second processor 44 outputs the toppling safety command signal as set out in step 107 of the method.

In step 106, the second processor 44 determines whether the first and second toppling moments exceed a predetermined threshold In some embodiments, the second processor 44 may check only the greater of the first and second toppling moment. If the second processor 44 determines the predetermined threshold is exceeded, the second processor 44 outputs the toppling safety command signal.

It will be appreciated that steps 103, 104, 105, and 106 may be performed in any suitable order by the first and second processors 43, 44. Concurrent processing between the first and second processor 43, 44 may also be provided such that at least some of the steps (e.g. steps 103 and 104) may be performed in parallel.

It will be appreciated from FIG. 2, that in step 107 of method 100 the safety control unit 40 may output the toppling safety command signal. For example, as shown in FIG. 2, the safety control unit 40 may output the toppling safety command signal to an ECU 70 of the lifting arm machine 1 to cause the lifting arm machine 1 to operate the lifting arm 10 in a toppling prevention mode. It will be appreciated from FIG. 5 that step 107 of the method is only performed when the second processor 44 determines that either of the predetermined threshold or the predetermined range is exceeded. In the event that such a determination is not made, the safety control unit 40 simply waits to receive further toppling moment information from the first and second signals for evaluation.

In some embodiments of the method 100, the safety control unit 40 further comprises a display 62 which outputs a value or signal indicative of the toppling moment of the lifting arm about the lifting arm machine 1 based on the first and/or second signals. For example, where the second processor 44 is the master processor, in step 106, the safety control unit 40 may also output a value or signal indicative of the greater of the first and second toppling moment of the lifting arm machine 1 to the display 62.

In some embodiments, as part of the method 100 the safety control unit 40 outputs a visible toppling warning signal and/or an audible toppling warning signal for an operator of the lifting arm machine 1 when the toppling safety command signal is output. For example, when the safety control unit 40 is provided as part of a display unit 60, the visible toppling warning signal and/or an audible toppling warning signal may be output via the display 62 or audio output.

Method 100 may be performed repeatedly by the safety control unit 40 while the lifting arm 10 of the lifting arm machine 1 is being operated. As such, the toppling sensor unit 50 may regularly transmit the first and second signals (steps 101 and 102) to the safety control unit 40, wherein the safety control unit 40 performs steps 103, 104, 105, and 106 on receipt of the first and second signals. The method may be repeated for example at least every: 10 ms, 100 ms or 1000 ms for example.

INDUSTRIAL APPLICABILITY

According to this disclosure a safety control unit 40 for controlling a lifting arm 10 of a lifting arm machine 1 is provided. A display unit 60 for a lifting arm machine 1, a safety control system 30 for a lifting arm machine 1, and a lifting arm machine 1 are also provided. Further, a method 100 of monitoring the toppling moment of a lifting arm machine 1 is also provided.

It will be appreciated that monitoring the toppling moment of a lifting arm machine 1 is a safety-critical task. The safety control unit 40 is configured to monitor two independent signals indicative of the toppling moment of the lifting arm machine 1. Further, the safety control unit 40 comprises two independent processors 43, 44 which independently monitor the toppling moment. Each processor independently determines a toppling moment. The safety control unit 40 also performs a cross-check function to monitor the relative values of the first and second toppling moments in order to detect a failure or excessive drift in either of the first and second toppling moments. Should the first and second toppling moments deviate from each other beyond a predetermined range, for example due to a sensor failure or excessive sensor drift, the safety control unit 40 also outputs the toppling safety command signal for the lifting arm machine 1 and/or operator to take further action.

The safety control unit 40 incorporates the two independent first and second processors 43, 44 within a single safety control unit housing 47. As such, the safety control unit 40 can provide lifting arm toppling monitoring functionality with built-in redundancy in a single unit. Such a single-unit device can be easily incorporated into the design of a machine or retrofitted onto existing machines in a straightforward manner. For such a safety critical monitoring task, it is undesirable to distribute the monitoring functionality across various different processors that may be provided on the machine (e.g. across one or more ECUs 70) as such processors may be difficult to update or replace. By integrating the processors into a single safety control unit, the risk of a maintenance task (e.g. replacing or updating an ECU 70) interfering with the monitoring functionality of the safety control unit is reduced or eliminated.

Furthermore, it will be appreciated that by providing the first and second processors 43, 44 in a single unit, communication between the two processors 43, 44 for the purpose of performing a cross-check can be implemented in a straightforward and robust manner. Where processors are distributed across a machine, implementing a cross-check functionality is more challenging to implement as a suitable communication protocol must be implemented for the safety-critical information. Furthermore, processors distributed across a machine may operate on different operating systems, making it more complicated to perform the cross-check function.

It will be appreciated that the present disclosure relate to lifting arm machines 1. A lifting arm machine 1 according to this disclosure is understood to be any machine which incorporates a lifting arm 10 for the purpose of lifting a payload. In particular, the present disclosure is applicable to lifting arm machines 1 wherein use of the lifting arm 10 to lift a payload results in a toppling moment acting on the lifting arm 10 about the lifting arm machine 1. That is to say, the weight of the lifting arm (and any payload of the lifting arm) may apply a toppling moment to the lifting arm machine 1 about a pivot point of the lifting arm machine 1. Such a toppling moment, if of sufficient magnitude, may cause the lifting arm machine 1 to topple over about the pivot point.

In particular, lifting arm machines 1 according to this disclosure may be a lifting arm vehicle. As such, a lifting arm vehicle comprises a lifting arm, and a chassis, wherein the lifting arm is attached to the chassis 20. The chassis may comprise wheels 22, tracks, or other motive means for moving the lifting arm vehicle. Examples of lifting arm vehicles include a variable reach vehicle, a telehandler, or a mobile elevating work platform.

What is claimed is:

1. A safety control unit for controlling a lifting arm of a lifting arm machine, the safety control unit comprising:
    a safety control unit housing;
    a sensor input configured to receive a first signal indicative of a toppling moment of the lifting arm about the lifting arm machine and a second signal indicative of the toppling moment of the lifting arm about the lifting arm machine, wherein the first and second signals are independent of each other;
    a first processor provided within the safety control unit housing and configured:
        to receive the first signal;
        to determine a first toppling moment based on the first signal; and
        to output the first toppling moment; and
    a second processor independent of the first processor and provided within the safety control unit housing, wherein the first processor and the second processor provide independent processing channels for the first signal and the second signal, the second processor configured:
        to receive the second signal;
        to determine a second toppling moment based on the second signal;
        to receive the first toppling moment from the first processor; and
        to cross-check that first toppling moment and the second toppling moment are within a predetermined range of each other,
    wherein the safety control unit is configured:
        to determine whether the first toppling moment and the second toppling moment exceed a predetermined threshold; and
        to output a toppling safety command signal if the safety control unit determines the predetermined threshold or the predetermined range is exceeded.

2. The safety control unit according to claim 1, wherein the safety control unit comprises an output port configured to output the toppling safety command signal to an Engine Control Unit (ECU) of the lifting arm machine to operate the lifting arm in a toppling prevention mode.

3. The safety control unit according to claim 2, wherein the output port is configured to output the toppling safety command signal over a Control Area Network (CAN) bus to the ECU.

4. The safety control unit according to claim 1, wherein the safety control unit is configured to output a visible toppling warning signal and/or an audible toppling warning signal for an operator of the lifting arm machine based on the toppling safety command signal.

5. The safety control unit according to claim 1, wherein the safety control unit is configured to monitor the toppling moment of the lifting arm machine based on the first and second signals at least once every: 1000 ms, 100 ms, or 10 ms.

6. The safety control unit according to claim 1, wherein the safety control unit is provided as a part of a display unit for the lifting arm machine, the display unit comprising:
    a display; and
    the safety control unit of claim 1.

7. The safety control unit according to claim 6, wherein the display is configured to output a value or signal indicative of the toppling moment of the lifting arm about the lifting arm machine based on the first and second toppling moments.

8. The safety control unit according to claim 7, wherein the display unit is configured to output a value or signal indicative of the toppling moment of the lifting arm about the lifting arm machine when the cross-check performed by the second processor confirms that first and second toppling moments are within a predetermined range of each other.

9. A lifting arm safety system for the lifting arm machine comprising:
  the safety control unit of claim 1; and
  a toppling sensor unit configured to be mounted to the lifting arm machine, the toppling sensor unit comprising:
    a first toppling sensor module configured to output the first signal indicative of a toppling moment of the lifting arm about the lifting arm machine; and
    a second toppling sensor module configured to output the second signal indicative of the toppling moment of the lifting arm about the lifting arm machine.

10. The lifting arm safety system according to claim 9, wherein the first toppling sensor module and the second toppling sensor module each comprise a strain gauge configured to be attached to a weight-bearing member of the lifting arm machine.

11. The lifting arm safety system according to claim 9, wherein the toppling sensor unit is configured to output the first and second signals to the sensor input of the safety control unit over a Control Area Network (CAN) bus.

12. The lifting arm safety system according to claim 9, wherein the toppling sensor unit further comprises a wireless communications module configured to output the first and second signals to the sensor input of the safety control unit using a wireless communication method.

13. The lifting arm safety system according to claim 9, wherein the first toppling sensor module is electrically isolated from the second toppling sensor module.

14. The lifting arm safety system according to claim 9, wherein the lifting arm safety system is provided as a part of the lifting arm machine, wherein the toppling sensor unit is mounted to the lifting arm machine.

15. The lifting arm safety system according to claim 14, further comprising:
  an Engine Control Unit configured to control the lifting arm, wherein the safety control unit is configured to output toppling safety command to the Engine Control Unit.

16. The lifting arm safety system according to claim 15, wherein the lifting arm machine includes a lifting arm vehicle, a variable reach vehicle, a telehandler, a mobile elevating work platform, or an aerial work platform.

17. A method of monitoring a toppling moment of a lifting arm machine comprising:
  sensing the toppling moment of a lifting arm about the lifting arm machine with a first toppling sensor module and outputting a first signal indicative of the toppling moment to a safety control unit; and
  sensing the toppling moment of the lifting arm about the lifting arm machine with a second toppling sensor module and outputting a second signal indicative of the toppling moment to the safety control unit;
  wherein the safety control unit:
    uses a first processor housed within the safety control unit to:
      determine a first toppling moment based on the first signal; and
      output the first toppling moment; and
    uses a second processor housed within the safety control unit and independent of the first processor, wherein the first processor and the second processor provide independent processing channels for the first signal and the second signal, to:
      determine a second toppling moment based on the second signal;
      receive the first toppling moment from the first processor; and
      cross-check that the first toppling moment and the second toppling moment are within a predetermined range of each other;
  wherein the safety control unit further:
    determines whether the first toppling moment and the second toppling moment exceed a predetermined threshold; and
    outputs a toppling safety command signal if the safety control unit determines that the predetermined threshold or the predetermined range is exceeded.

18. The method according to claim 17 wherein the safety control unit outputs the toppling safety command signal to an Engine Control Unit of the lifting arm machine to cause the lifting arm machine to operate the lifting arm in a toppling prevention mode.

19. The method according to claim 17, wherein the safety control unit further comprises a display which outputs a value or signal indicative of the toppling moment of the lifting arm about the lifting arm machine based on the first and second signals.

20. The method according to claim 17, wherein the safety control unit outputs a visible toppling warning signal and an audible toppling warning signal for an operator of the lifting arm machine based on the toppling safety command signal.

* * * * *